United States Patent
Ishikawa et al.

(10) Patent No.: US 10,156,866 B2
(45) Date of Patent: Dec. 18, 2018

(54) DISPLAY DEVICE AND ELECTRONIC APPARATUS

(71) Applicant: NEC PERSONAL COMPUTERS, LTD., Tokyo (JP)

(72) Inventors: Kazuki Ishikawa, Tokyo (JP); Hidetaka Umetsu, Tokyo (JP); Tsuyoshi Taira, Tokyo (JP)

(73) Assignee: NEC PERSONAL COMPUTERS, LTD., Tokyo (JP)

( * ) Notice: Subject to any disclaimer, the term of this patent is extended or adjusted under 35 U.S.C. 154(b) by 0 days.

(21) Appl. No.: 15/872,367

(22) Filed: Jan. 16, 2018

(65) Prior Publication Data

US 2018/0210498 A1 Jul. 26, 2018

(30) Foreign Application Priority Data

Jan. 24, 2017 (JP) .................... 2017-10428

(51) Int. Cl.
*G06F 1/16* (2006.01)
*G02F 1/1333* (2006.01)

(52) U.S. Cl.
CPC .......... *G06F 1/1616* (2013.01); *G06F 1/1637* (2013.01); *G06F 1/1681* (2013.01); *G02F 1/133308* (2013.01); *G02F 2001/133314* (2013.01); *G02F 2001/133328* (2013.01)

(58) Field of Classification Search
CPC ................. G02F 1/133308; G02F 2001/13332
USPC ..................................................... 349/58–60
See application file for complete search history.

(56) References Cited

U.S. PATENT DOCUMENTS

| | | | |
|---|---|---|---|
| 7,646,447 B2* | 1/2010 | Kim .................. | G02F 1/133308 349/58 |
| 8,692,951 B2* | 4/2014 | Tanaka .............. | G02F 1/133308 349/58 |
| 2005/0110917 A1* | 5/2005 | Shida ................ | G02F 1/133308 349/58 |
| 2005/0146650 A1* | 7/2005 | Chung .............. | G02F 1/133308 349/58 |
| 2005/0179832 A1* | 8/2005 | Kim .................. | G02F 1/133308 349/58 |
| 2005/0259191 A1* | 11/2005 | Park .................. | G02F 1/133308 349/58 |
| 2006/0139509 A1* | 6/2006 | Chang ............... | G02F 1/133308 349/58 |
| 2007/0008452 A1* | 1/2007 | Kim .................. | G02F 1/133308 349/58 |

(Continued)

FOREIGN PATENT DOCUMENTS

| | | |
|---|---|---|
| JP | 2001-083887 A | 3/2001 |
| JP | 2010243620 A | 10/2010 |

(Continued)

*Primary Examiner* — Adrian S Wilson
(74) *Attorney, Agent, or Firm* — Shimokaji IP

(57) ABSTRACT

In a display device, the display unit chassis is configured by including a peripheral wall section which is disposed to cover the circumference of a liquid crystal panel, and a bezel case section which is disposed between the liquid crystal panel and the peripheral wall section in a state of covering a surface of a peripheral edge of the liquid crystal panel, side-edge sections whose engagement is limited only to the liquid crystal panel are disposed on both of left and right sides of the bezel case section.

7 Claims, 6 Drawing Sheets

(56) References Cited

U.S. PATENT DOCUMENTS

| 2007/0171323 A1* | 7/2007 | Lin | G02F 1/133308 |
| | | | 349/58 |
| 2008/0031007 A1 | 2/2008 | Wintek | |
| 2010/0061120 A1* | 3/2010 | Lin | G02F 1/133608 |
| | | | 362/633 |
| 2011/0037919 A1 | 2/2011 | Lin | |

FOREIGN PATENT DOCUMENTS

| JP | 2012-003624 A | 1/2012 |
| JP | 2012-058546 A | 3/2012 |

* cited by examiner

DISPLAY DEVICE AND ELECTRONIC APPARATUS

FIELD OF THE INVENTION

The present invention relates to a display device and an electronic apparatus equipped with the display device.

BACKGROUND OF THE INVENTION

In the electronic apparatuses such as a cell phone, a Laptop PC and so forth, there exists the electronic apparatus of the type that a main body chassis which is provided with an input unit such as a keyboard and so forth is disposed separately from a display unit chassis on which a display such as a liquid crystal panel and so forth is loaded and the main body chassis and the display unit chassis are connected with each other via a hinge device to be openable/closable. The display unit chassis of the type including a main case section which is disposed so as to cover a back surface and the circumference of the display and a bezel case section which covers a front surface of a peripheral edge of the display is generally used. An engagement claw which is engaged with a claw receiving part of the main case section is disposed on the bezel case section. In the electronic apparatus of the above-described type, the display is disposed on the main case section, thereafter the bezel case section is disposed so as to cover the display, then the engagement claw is brought into engagement with the claw receiving part of the main case section and thereby the display is loaded on the display unit chassis in a state where the display unit is exposed to the outside (for example, see Patent Document 1).

[Patent Document 1] Japanese Patent Application Laid-Open No. 2010-243620

SUMMARY OF THE INVENTION

In the above-described electronic apparatus, in a case where width-narrowing of the peripheral edge of the display which does not directly contribute to image display is possible, downsizing of the display unit chassis becomes possible without changing the dimensions of the display. That is, the extent to which the dimensions of parts of the display unit chassis section which project from the circumference of the display are set small is very important for promotion of downsizing of the display unit chassis.

However, the engagement claw of the bezel case section and the claw receiving part of the main case section are brought into engagement with each other on the circumference of the display. Accordingly, it is unavoidable to secure the dimensions which are sufficient for installation of the engagement claw and the claw receiving part on the circumference of the display as the dimensions of the bezel case section and the main case section and securing of the dimensions hinders downsizing of the display unit chassis.

The present invention has been made in view of the above-described circumstances and aims to provide a display device and an electronic apparatus capable of promoting downsizing of the display unit chassis without changing the dimensions of the display.

In order to solve the above-described issue and to attain the above-described aim, a display device according to the first aspect of the present invention is the display device that a display unit chassis is configured by including a first case section which is disposed to cover the circumference of a display and a second case section which is disposed between the display and the first case section in a state of covering a surface of a peripheral edge of the display, wherein a display engagement part whose engagement object is limited to only the display is disposed on at least part of the second case section.

In addition, in the above-described display device according to the first aspect of the present invention, the display has a rectangular external form and the display engagement parts are disposed on the second case section along full lengths of places which correspond to two edges of the display which extend in parallel with each other respectively.

In addition, in the above-described display device according to the first aspect of the present invention, the first case section is disposed on a peripheral edge of a third case section which covers a back surface of the display integrally with the third case section.

In addition, in the above-described display device according to the first aspect of the present invention, the display engagement part includes a display cover part which is disposed to face a front surface of the display, a vertical wall part which projects from a back surface of the display cover part so as to cover the circumference of the display and is formed continuously along one edge of the display, and display engagement claws which project from a plurality of mutually separated positions on a projected edge of the vertical wall part toward the inner circumference side so as to face a back surface of the display respectively.

In addition, in the above-described display device according to the first aspect of the present invention, an elastic member is disposed on a place which faces the display in a state of being interposed between the vertical wall and the display.

In addition, an electronic apparatus according to the second aspect of the present invention includes the above-described display device.

In addition, in the electronic apparatus according to the second aspect of the present invention, the display unit chassis of the display device is supported by a hinge device to be movable relative to a main body chassis and shifts to a state of covering a front surface of the main body chassis and then to a state of leaving the front surface of the main body chassis open, and electronic components which provide additional functions are disposed on a place between the display and the main body chassis.

In addition, in the electronic apparatus according to the second aspect of the present invention, the hinge device includes a hinge unit chassis which is formed separately from the display unit chassis and the main body chassis, and the electronic components are housed in the hinge unit chassis.

In the above-described aspects of the present invention, since the engagement object of the display engagement part of the second case section is limited to only the display, the display engagement part does not project to the outer circumference side and it is possible to make the outside dimension of the second case section small. In addition, since it is not necessary to dispose a part to be engaged with the second case section on a place which corresponds to the display engagement part also on the first case section, it is also possible to make the outside dimension of the first case section small. Consequently, the above-described aspects of the present invention are able to promote downsizing of the display unit chassis also in a case where the display of the same dimensions as the above is applied.

DETAILED DESCRIPTION OF THE INVENTION

In the following, preferred embodiments of the display device and the electronic apparatus according to the first and second aspects of the present invention will be described with reference to the appended drawings.

Figure 1:
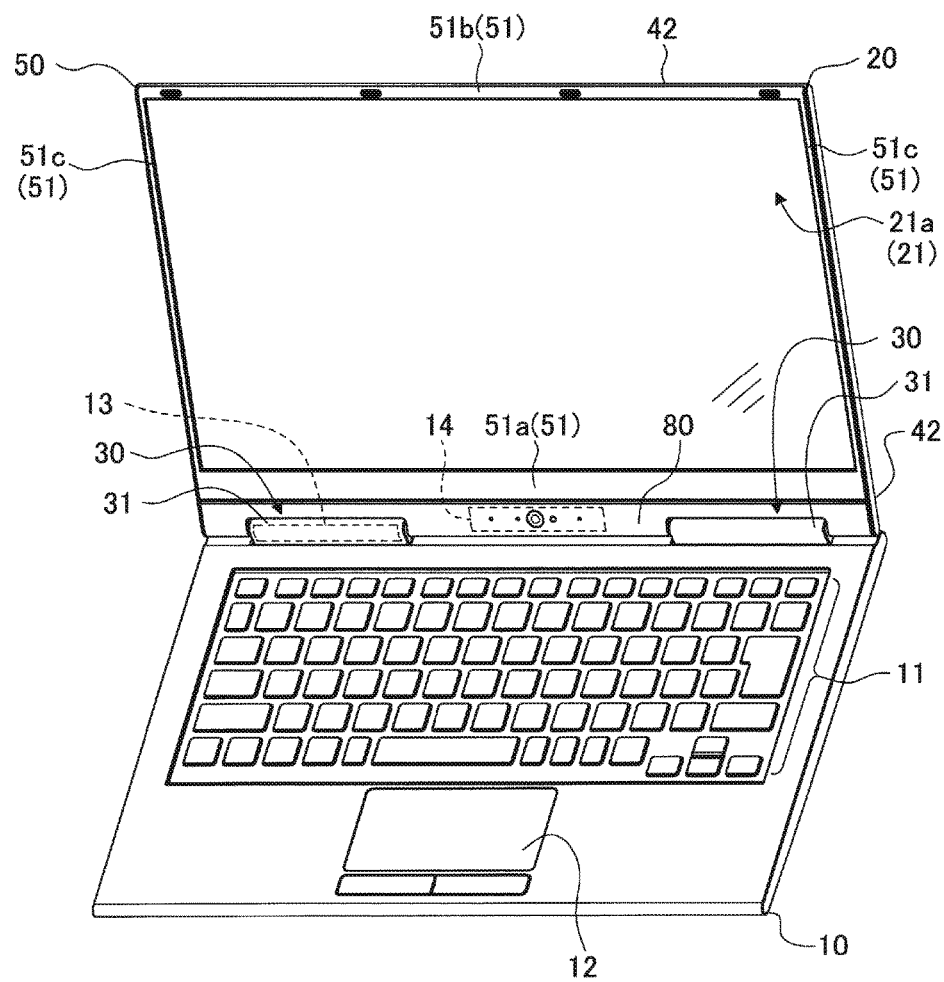
FIG. 1 is a perspective view illustrating one example of an electronic apparatus which is equipped with a display device according to one embodiment of the present invention.
Figure 1:
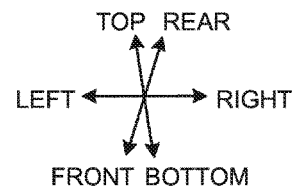

FIG. 1 illustrates one example of an electronic apparatus which includes a display device according to one embodiment of the present invention. The electronic apparatus illustrated in FIG. 1 is configured by connecting a main body chassis 10 with a display unit chassis 20 of the display device via a hinge device 30 to be mutually openable/closable. The main body chassis 10 has a rectangular shape which is small in thickness dimension and a keyboard 11 and a touch pad 12 are disposed on its upper face as input units. Although not clearly illustrated in FIG. 1, various main electronic components such as a circuit board, an arithmetic operation device, a memory and so forth are disposed inside the main body chassis 10. The display unit chassis 20 is adapted to load a liquid crystal panel (a display) 21 thereon in a state where a display unit on a front surface 21a of the liquid crystal panel 21 is exposed to the outside. In the present embodiment, the touch-panel type liquid crystal panel 21 which is smaller than the main body chassis 10 in outside dimension and has a thin rectangular shape is applied, and as the display unit chassis 20 on which the liquid crystal panel 21 is to be loaded, a display unit chassis which is almost the same as the main body chassis 10 in size and has a rectangular shape is applied. Hinge devices 30 are adapted to connect a rear edge of the main body chassis 10 with a lower edge of the display unit chassis 20 and are disposed at two mutually separated positions. Although not clearly illustrated in FIG. 1, in the present embodiment, the hinge device 30 having a two-shaft structure which is configured in a hinge unit chassis 31 is applied particularly. The hinge unit chassis 31 is configured separately from the main body chassis 10 and the display unit chassis 20.

In the electronic apparatus to which the above-described hinge device 30 is applied, it is possible to rotate the display unit chassis 20 through about 360° from a state where the display unit chassis 20 covers an upper face of the main body chassis 10 to a state of where the display unit chassis 20 covers a upper face of the main body chassis 10. That is, the electronic apparatus of the present embodiment is a convertible-type personal computer (in the following, referred to as a PC) and is able to be used as a Laptop PC by opening the display unit chassis 20 by about 90° relative to the main body chassis 10 as illustrated in FIG. 1 and is able to be used as a tablet-type PC by further opening the display unit chassis 20 up to about 360° and superposing the display unit chassis 20 on the lower face of the main body chassis 10. Although not clearly illustrated in FIG. 1, the liquid crystal panel 21 is electrically connected with main electronic components disposed inside the main body chassis 10 via a cable which passes through within the hinge unit chassis 31. In addition, an antenna 13 which is an electronic component used for performing wireless communication is housed in one of the hinge unit chassis 31.

Figure 2:
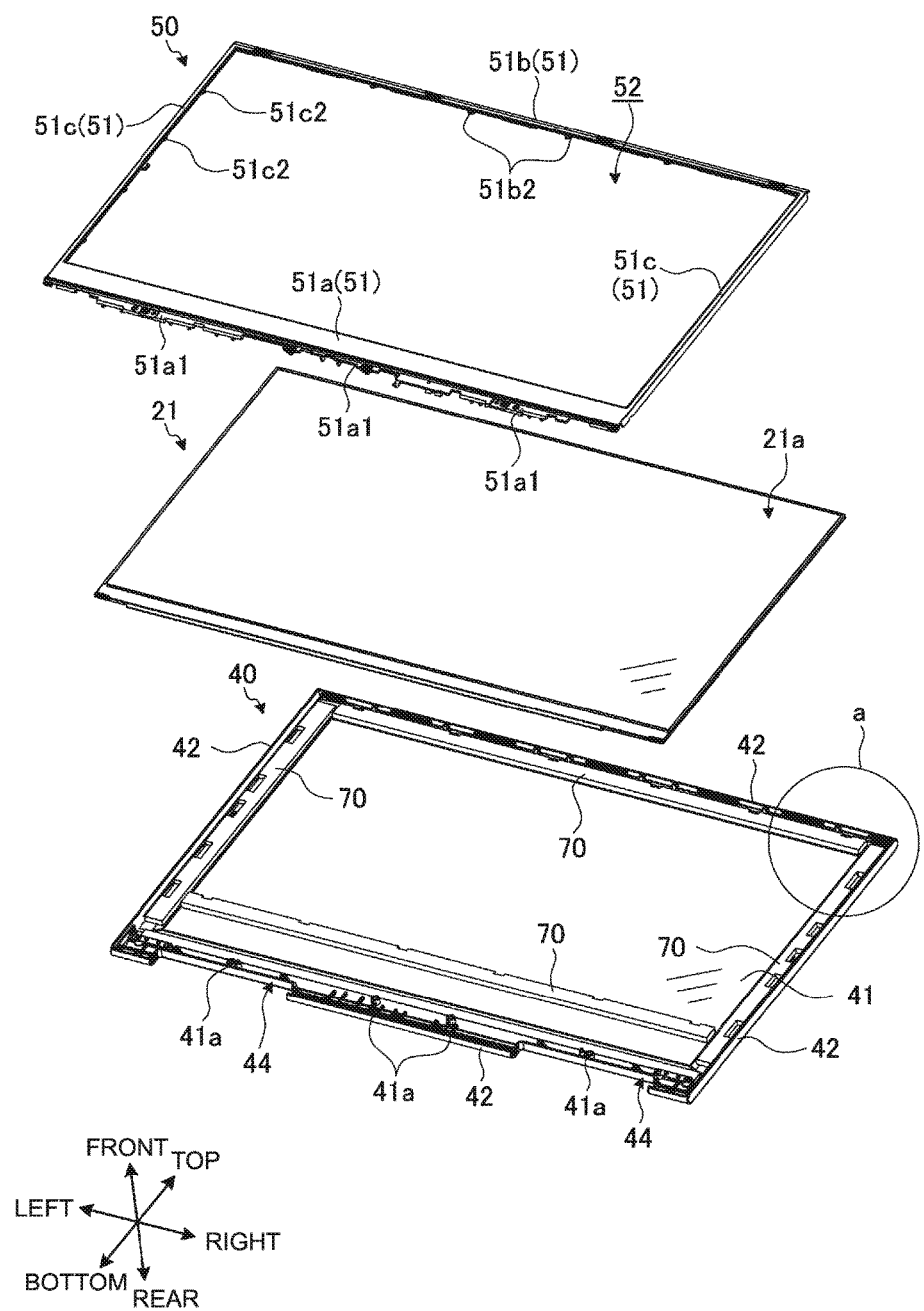
FIG. 2 is an exploded perspective view illustrating one example of a display, a first case section and a second case section which configure the display device which is applied to the electronic apparatus illustrated in FIG. 1.
Figure 3:
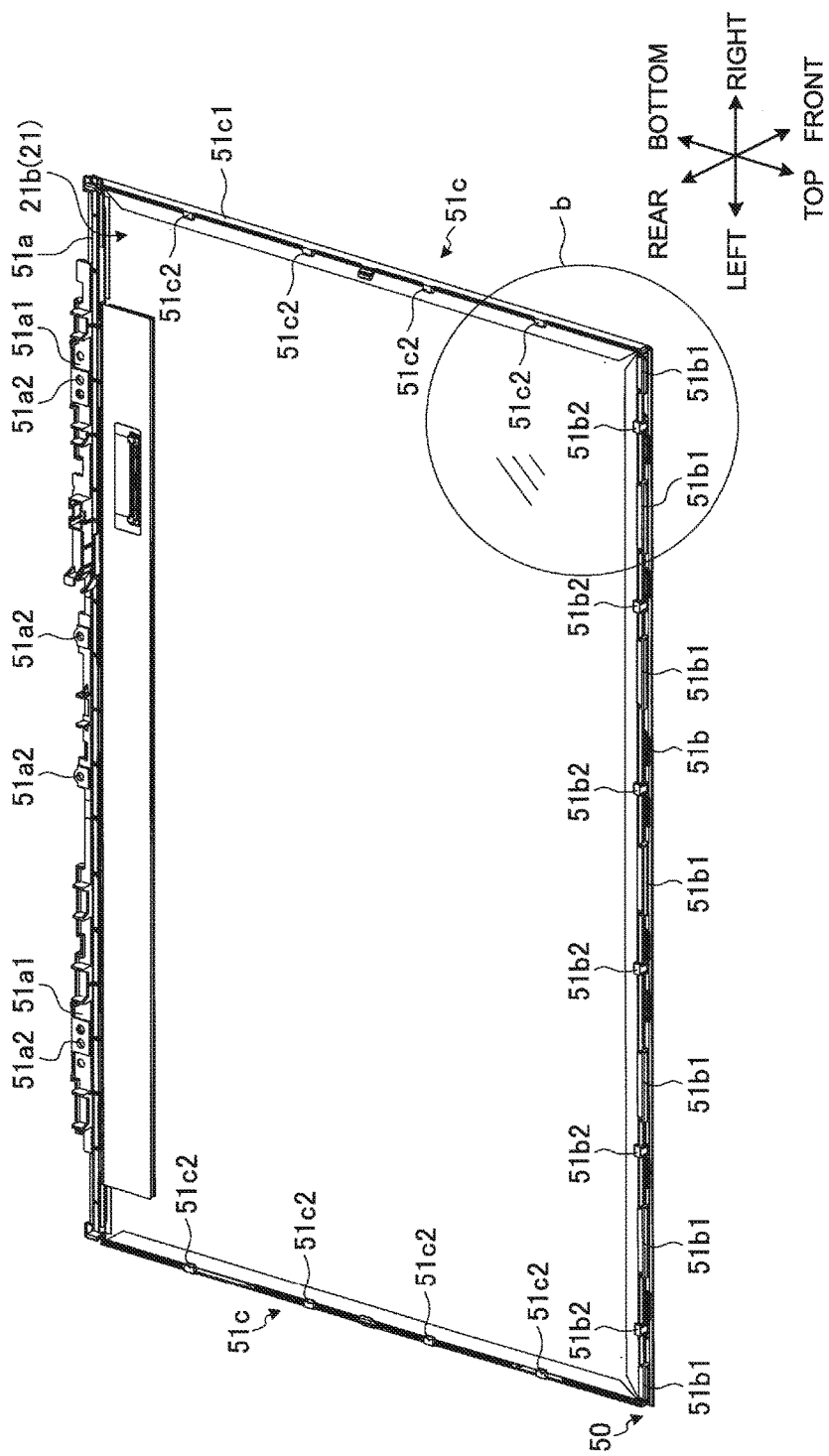
FIG. 3 is a perspective view illustrating one example of a state where the second case section is mounted onto the display illustrated in FIG. 2.
Figure 4:
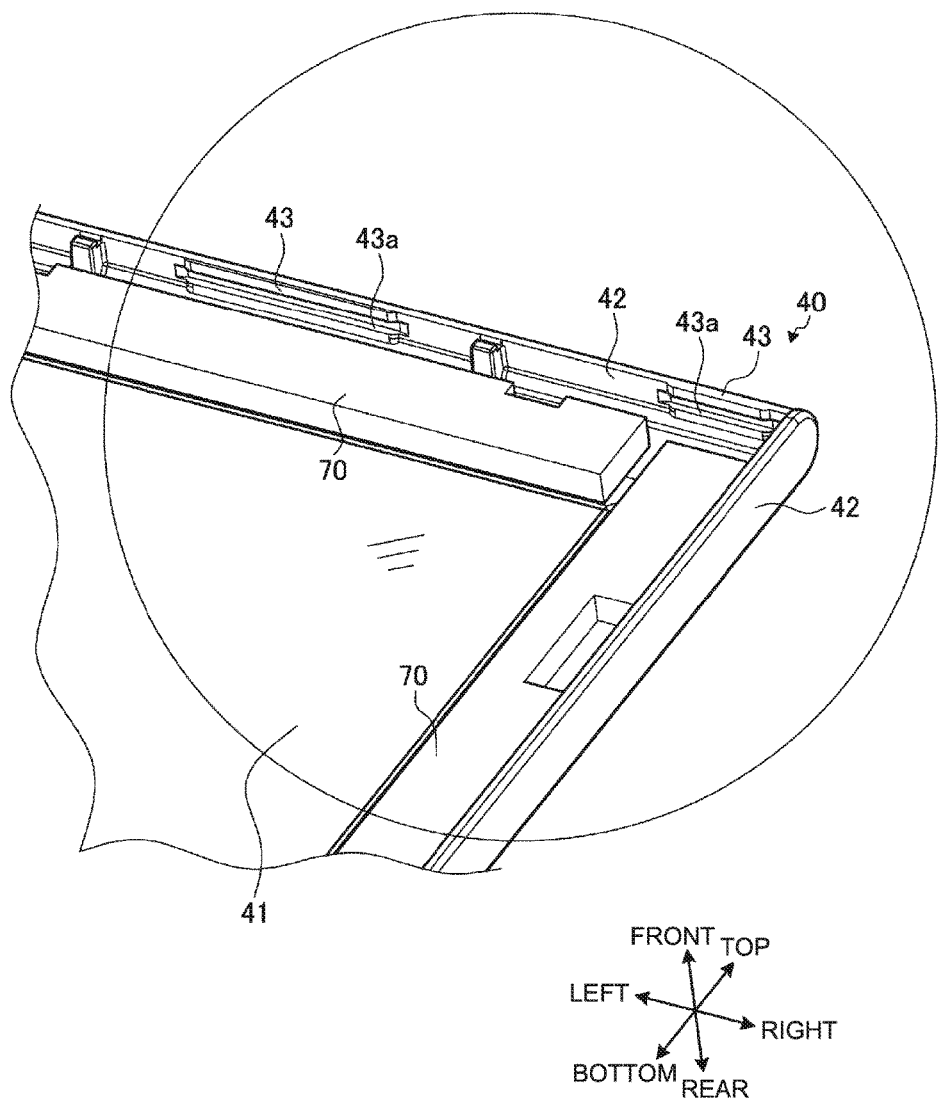
FIG. 4 is an enlarged diagram illustrating one example of a part "a" in FIG. 2.
Figure 5:
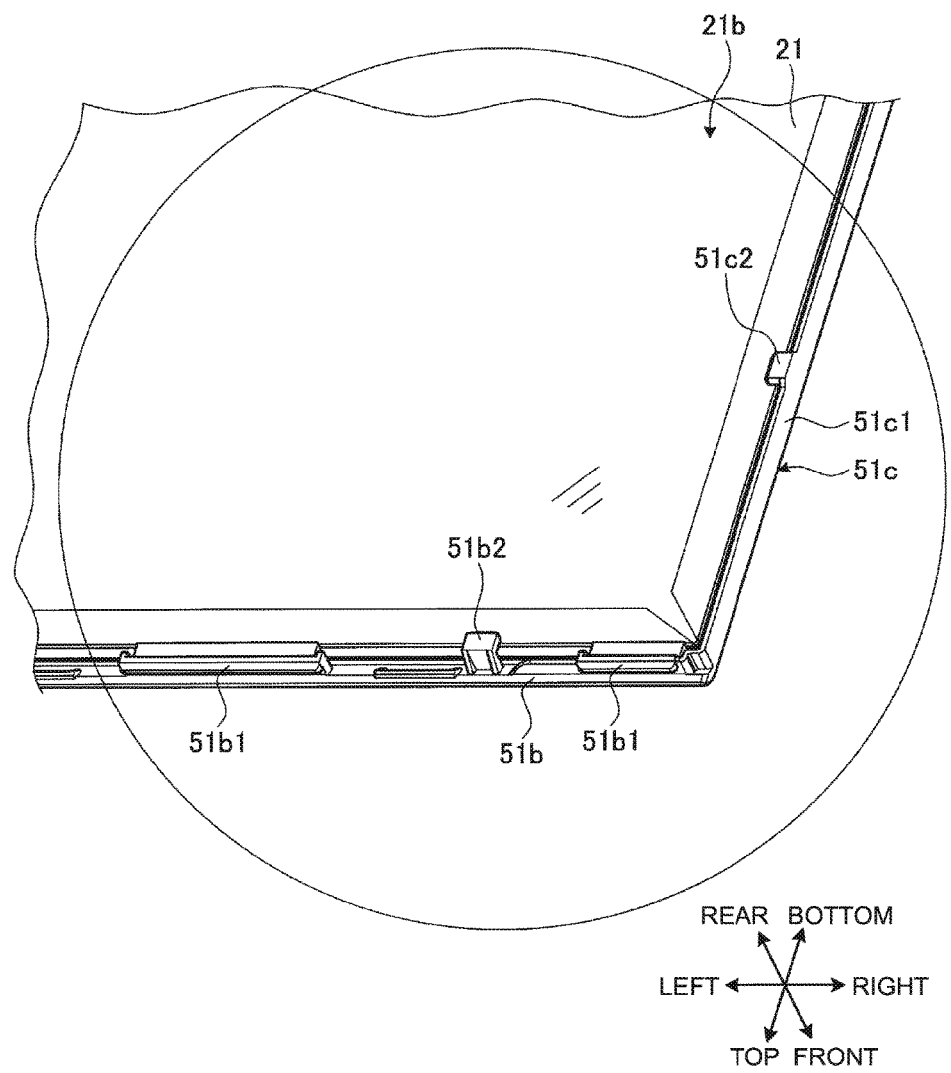
FIG. 5 is an enlarged diagram illustrating one example of a part "b" in FIG. 3.
Figure 6:
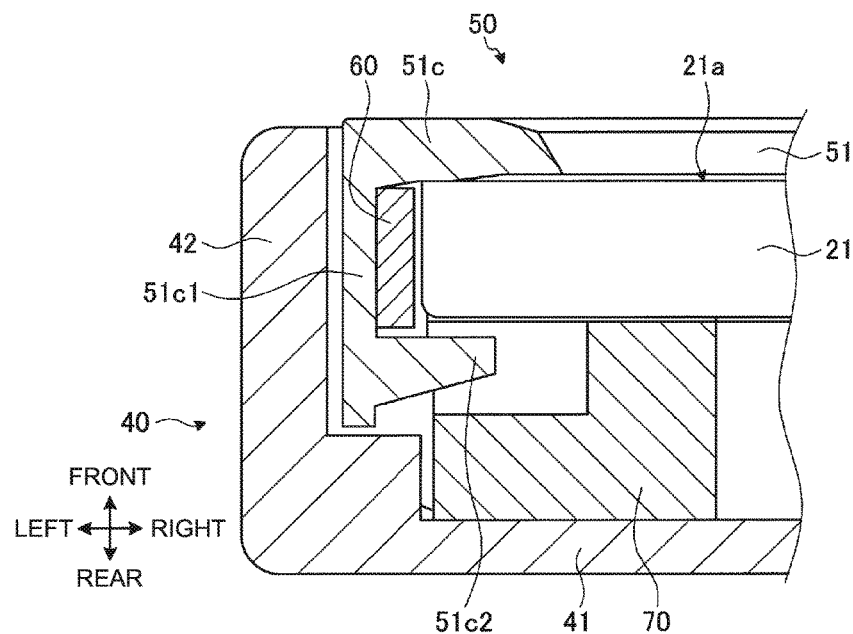
FIG. 6 is an enlarged sectional diagram illustrating one example of a side edge part which serves as a display engagement part of the display device illustrated in FIG. 1.
Figure 7:
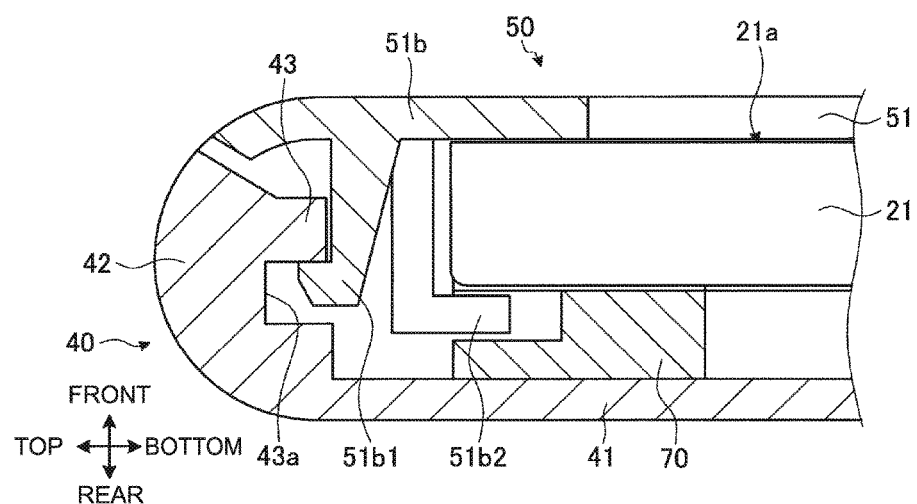
FIG. 7 is an enlarged sectional diagram illustrating one example of an upper edge part of the display device illustrated in FIG. 1.

FIG. 2 and FIG. 3 illustrate the display device of the above-described electronic apparatus in an exploded state and FIG. 4 to FIG. 7 illustrate main parts of the display device in an enlarged state. In the following, details of a configuration of the display device will be described with reference to the above-described drawings and characteristic parts of the invention of the present application will be described simultaneously. Incidentally, in the following, an up-down direction, a left-right direction and a front-rear direction of the display device will be specified in a state illustrated in FIG. 1 for convenience of illustration.

As seen from FIG. 2, the display unit chassis 20 of the display device has a main case section 40 and a bezel case section (a second case section) 50 which are made of resinous materials respectively.

The main case section 40 is configured by integrating a cover plate section (a third case section) 41 with a peripheral wall section (a first case section) 42. The cover plate section 41 is adapted to cover a back surface 21b of the liquid crystal panel 21 and has an almost rectangular thin plate shape which is larger than the liquid crystal panel 21 in up-down and left-right dimensions. Depression parts 44 in which the hinge unit chassis 31 of the hinge devices 30 are to be disposed are formed in a lower edge of the cover plate section 41 on places corresponding to the two hinge devices 30. The peripheral wall section 42 is adapted to cover the circumference of the liquid crystal panel 21 and projects from the whole peripheral edge of the cover plate section 41. Claw receiving parts 43 are formed on an inner-circumference-side face of the peripheral wall section 42 which extends along an upper edge of the liquid crystal panel 21. The claw receiving parts 43 each have a trapezoidal shape which projects downward from an inner-circumference-side lower face of the peripheral wall section 42 and are disposed at a plurality of mutually separated positions. An engagement groove 43a is formed in each claw receiving part 43. Each of the engagement grooves 43a is a narrow-width recessed part which extends along a front face (an inner-side front face) of the cover plate section 41.

The bezel case section 50 is adapted to hold the liquid crystal panel 21 in a state of containing (interposing) the liquid crystal panel 21 between the main case section 40 and the bezel case section 50 and has a display cover part 51. The display cover part 51 is a thin-plate member which covers a front face (the front surface side) of a peripheral edge of the liquid crystal panel 21 and is formed into a rectangular frame shape having a window hole 52. That is, in the bezel case section 50, the display cover part 51 exhibits the rectangular frame shape having a lower edge part 51a, an upper edge part 51b and left and right side edge parts (display engagement parts) 51c and has the rectangular window hole 52 among (surrounded by) the above-described edge parts. The lower edge part 51*a* and the upper edge part 51*b* extend in parallel with each other, and the left and right side edge parts 51*c* extend in parallel with each other. The up-down and left-right dimensions of the display cover part 51 are made larger than those of the liquid crystal panel 21 and smaller than those of the main case section 40. The window hole 52 in the display cover part 51 is configured to have the up-down and left-right dimensions which are smaller than those of the liquid crystal panel 21.

The lower edge part 51*a* of the display cover part 51 has fastening plates 51*a*1 which project downward from a lower-edge-side part thereof respectively and screw insertion holes 51*a*2 are formed in each of the fastening plates 51*a*1 at a plurality of positions. The screw insertion holes 51*a*2 in each of the fastening plates 51*a*1 are through-holes which are formed in correspondence with bosses 41*a* on the cover plate section 41.

Case engagement claws 51*b*1 and display engagement hooks 51*b*2 are disposed on the upper edge part 51*b* of the display cover part 51. The case engagement claws 51*b*1 are formed so as to project rearward from a rear face of the upper edge part 51*b* to be almost at right angles to the upper edge part 51*b* and then to be bent upward almost at right angles and are disposed at a plurality of positions corresponding to the claw receiving parts 43 of the main case section 40. The display engagement hooks 51*b*2 are formed so as to project rearward from the rear face of the upper edge part 51*b* to be almost at right angles to the upper edge part 51*b* and then to be bent downward almost at right angles and each are disposed at a position between the adjacent case engagement claws 51*b*1. As seen from FIG. 3, the case engagement claws 51*b*1 each are formed to have the left-right dimension which is sufficiently larger than that of each display engagement hook 51*b*2 and is configured so as not to be elastically deformed with ease even in a case where external force is exerted on the case engagement claw 51*b*1.

On the other hand, in the bezel case section 50, a vertical wall part 51*c*1 and display engagement claws 51*c*2 are disposed on each of the left and right side edge parts 51*c* of the display cover part 51. The vertical wall part 51*c*1 has a thin-plate shape which projects rearward from a rear face of the side edge part 51*c* to be almost at right angles to the side edge part 51*c* and is formed along the full length of each side edge part 51*c*. The dimension of a projection of the vertical wall part 51*c*1 is set slightly larger than a panel thickness of the liquid crystal panel 21. The display engagement claws 51*c*2 project from a plurality of mutually separated positions (four positions in an example illustrated in FIG. 3) on a projected edge of the vertical wall part 51*c*1 to the inner circumference side toward the window hole 52. A space which is slightly larger than the left-right dimension of the liquid crystal panel 21 is secured between the vertical wall part 51*c*1 provided on the one-side side edge part 51*c* and the vertical wall part 51*c*1 provided on the other-side side edge part 51*c*. On the other hand, a space which is smaller than the left-right dimension of the liquid crystal panel 21 is secured between mutual leading ends of the adjacent display engagement claws 51*c*2 provided on each of the side edge parts 51*c*.

The display unit chassis 20 is configured by mounting the bezel case section 50, so configured as described above, onto the liquid crystal panel 21 in advance and attaching the bezel case section 50 to the main case section 40 together with the liquid crystal panel 21. Describing in more detail, first, a belt-shaped elastic member such as, for example, sponge 60 is held in a state of being disposed on an inner-circumference-side face of the vertical wall part 51*c*1 in the bezel case section 50. For example, adhesive double-sided tape may be applied in order to make the vertical wall part 51*c*1 hold the sponge 60. An upper edge of the liquid crystal panel 21 is inserted into between the upper edge part 51*b* and the display engagement hooks 51*b*2 of the display cover part 51 and then each of both side edges of the liquid crystal panel 21 is inserted into between the side edge part 51*c* and the display engagement claws 51*c*2 of the display cover part 51. At this time, when the external force is applied to the display cover part 51 in such a manner that the side edge parts 51*c* are separated from each other, the side edge parts 51*c* are elastically deformed into curved shapes and thereby the space between the side edge parts 51*c* is increased. Therefore, it becomes possible to perform with ease work of inserting each of the both side edges of the liquid crystal panel 21 into between the side edge part 51*c* and the display engagement claws 51*c*2.

The liquid crystal panel 21 is mounted on the bezel case section 50 in this way and thereafter pieces of sponge 70 which serve as cushion seats are disposed on places which correspond to a peripheral edge of the liquid crystal panel 21 on an upper face of the cover plate section 41. Then, the bezel case section 50 with the liquid crystal panel 21 being mounted is disposed within the peripheral wall section 42 of the main case section 40 in this state. That is, the case engagement claws 51*b*1 on the bezel case section 50 are inserted into the engagement grooves 43*a* in the claw receiving parts 43 disposed on the peripheral wall section 42; thereafter screws are threadedly engaged with the bosses 41*a* of the main case section 40 via the screw insertion holes 51*a*2 formed in the fastening plate 51*a*1 of the lower edge part 51*a*, and thereby the bezel case section 50 is held on the main case section 40. It is preferable to dispose the adhesive double-sided tape at appropriate positions, particularly, on parts of the upper faces of the pieces of sponge 70 which abut on the both side edges of the liquid crystal panel 21 in advance. Further, a sub-cover section 80 is mounted on a place located lower than the bezel case section 50 so as to cover and conceal a front face of the fastening plate 51*a*1 with the screws being threadedly engaged with the bosses 41*a* (see FIG. 1). An imaging unit 14 which includes electronic components such as an imaging element and so forth may be disposed on a place of the main case section 40 which is covered with the sub-cover section 80 and may be electrically connected with an image processing unit (not illustrated) disposed inside the main body chassis 10.

Here, in the above-described electronic apparatus, the case engagement claws 51*b*1 and the display engagement hooks 51*b*2 are disposed on the upper edge part 51*b* of the display cover part 51, and the claw receiving parts 43 are disposed on a place of the main case section 40 which corresponds to the upper edge part 51*b* of the display cover part 51. Therefore, it is preferable for the upper edge part 51*b* to have a width which is sufficient for installation of the case engagement claws 51*b*1 and the display engagement hooks 51*b*2 and to secure the width which is sufficient to cover and conceal the claw receiving parts 43 of the main case section 40. As described above, the antenna 13 is disposed inside the hinge device 30, and the imaging unit 14 is disposed at the position which is lower than the liquid crystal panel 21 on the main case section 40. Therefore, in a case where the above-described electronic apparatus is compared with an electronic apparatus that these electronic components 13 and 14 are housed in the upper edge part 51*b*, it becomes possible to promote width narrowing of the parts located higher than the liquid crystal panel 21.

On the other hand, a configuration which is directly engaged with the main case section 40 is not provided on each of the left and right side edge parts 51c of the display cover part 51. That is, on the side edge parts 51c, only the display engagement claws 51c2 project from the vertical wall parts 51c1 toward the inner circumference side. In addition, since it is not necessary to provide the claw receiving part also on the corresponding main case section 40, it is not necessary to secure the part which covers and conceals the main case section 40. Further, since the electronic components such as the antenna 13, the imaging unit 14 and so forth are disposed on the place between the liquid crystal panel 21 and the main body chassis 10, it is not necessary to secure a space through which the cable, which extends from the antenna 13 and the imaging unit 14, passes between each of side edge parts 51c and the peripheral wall section 42 of the main case section 40. Consequently, according to the above-described electronic apparatus, it is possible to promote the width narrowing of the parts located on the lateral side of the liquid crystal panel 21 more than the width narrowing of the upper edge part 51b and, in addition, also in a case where the liquid crystal panel 21 of the same dimensions as the above is applied, it is possible to reduce the left-right dimension of the display unit chassis 20.

Moreover, since the display engagement claws 51c2 are disposed on the side edge parts 51c of the display cover part 51 in a state of facing the back surface 21b of the liquid crystal panel 21, and further the side edge parts 51c are held to the main case section 40 with the adhesive double-sided tape via the pieces of sponge 70 and the liquid crystal panel 21, there is no fear that such a situation that the side edge parts 51c are raised from the main case section 40 may be induced. In addition, the vertical wall parts 51c1 are disposed along the full lengths of the side edge parts 51c. Accordingly, the vertical wall parts 51c1 act against the external force and therefore there is no fear that the side edge parts 51c may be bent in a depth direction. Further, the peripheral wall section 42 of the main case section 40 is disposed adjacently to outer-circumference-side parts of the side edge parts 51c and the sponge 60 is disposed on the place between each of the vertical wall parts 51c1 and the liquid crystal panel 21. Accordingly, even in a case where, for example, an operator puts his/her finger to one of the side edge parts 51c when performing a touching operation so as to slide the finger on the front surface of the liquid crystal panel 21, a situation that the side edge part 51c is bent in the left-right direction is not induced.

Incidentally, although in the above-described embodiment, the convertible-type PC that the display unit chassis 20 is able to rotate 360° relative to the main body chassis 10 is exemplified, the present invention is not limited to this and is applicable to other apparatuses of the type that the display unit chassis 20 is equipped with the display such as a general Laptop PC and a general cell phone configured so that the display unit chassis 20 rotates only to about 180° relative to the main body chassis 10, and a smartphone, an electronic organizer and so forth configured by being equipped with only the display device. In this case, it is not typically necessary to configure the display by the liquid crystal panel and it is not necessary to form the display into the rectangular shape. In addition, it is not necessary to dispose the part where the display engagement part is provided along the full length of the edge of the display on the second case section. The display engagement part may be disposed continuously on part of the second case section.

In addition, since in the above-described embodiment, a series of the vertical wall parts 51c1 is disposed on the side edge parts 51c which serve as the display engagement parts, and the display engagement claws 51c2 are disposed at the plurality of positions on each vertical wall part 51c1, it is possible to ensure desirable strength for the narrowed side edge parts 51c by providing the vertical wall parts 51c1. However, it is not typically necessary for the side edge parts 51c to have the vertical wall parts 51c1.

Further, although in the above-described embodiment, the antenna 13 is disposed inside the hinge device 30 and the imaging unit 14 is disposed at the position located lower than the display on the main case section 40, provision of these electronic components which provide the additional functions is not typically necessary.

The invention claimed is:

1. A display device having a display unit chassis configured with a first case section disposed to cover a circumference of a display, and a second case section disposed between the display and the first case section in a state of covering a surface of a peripheral edge of the display, wherein:
    a display engagement part, which only engages the display, is disposed on at least part of the second case section;
    wherein the display engagement part includes a display cover part which is disposed to face a front surface of the display, a vertical wall part which projects from a back surface of the display cover part so as to cover the circumference of the display and is formed continuously along one edge of the display, and display engagement claws which project from a plurality of mutually separated positions on a projected edge of the vertical wall part toward an inner circumference side so as to face a back surface of the display.

2. The display device according to claim 1, wherein:
    the display has a rectangular external form and the display engagement part is disposed on the second case section along full lengths of places which correspond to two edges of the display which extend in parallel with each other.

3. The display device according to claim 1, wherein:
    the first case section is disposed on a peripheral edge part of a third case section which covers the back surface of the display integrally with the third case section.

4. The display device according to claim 1, wherein:
    an elastic member is disposed to face the display in a state of being interposed between the vertical wall part and the display.

5. An electronic apparatus comprising:
    a display device having a display unit chassis configured with a first case section disposed to cover a circumference of a display, and a second case section disposed between the display and the first case section in a state of covering a surface of a peripheral edge of the display, wherein:
    a display engagement part, which only engages the display, is disposed on at least part of the second case section;
    wherein the display engagement part includes a display cover part which is disposed to face a front surface of the display, a vertical wall part which projects from a back surface of the display cover part so as to cover the circumference of the display and is formed continuously along one edge of the display, and display engagement claws which project from a plurality of mutually separated positions on a projected edge of the vertical wall part toward an inner circumference side so as to face a back surface of the display.

6. The electronic apparatus according to claim 5, wherein:
the display unit chassis of the display device is supported by a hinge device to be movable relative to a main body chassis and shifts to a state of covering a front surface of the main body chassis and then to a state of leaving the front surface of the main body chassis open, and
electronic components between the display and the main body chassis.

7. The electronic apparatus according to claim 6, wherein:
the hinge device includes a hinge unit chassis which is formed separately from the display unit chassis and the main body chassis, and the electronic components are housed in the hinge unit chassis.

\* \* \* \* \*